(12) United States Patent
Jones et al.

(10) Patent No.: US 7,012,806 B2
(45) Date of Patent: Mar. 14, 2006

(54) PORTABLE ELECTRONIC DEVICE WITH ADAPTIVE SIZING

(75) Inventors: Jeffrey Allen Jones, Round Rock, TX (US); Scott Thomas Jones, Austin, TX (US); Michael Aaron Kaply, Austin, TX (US); Alvaro Sanchez-Cifuentes, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 253 days.

(21) Appl. No.: 10/422,038

(22) Filed: Apr. 23, 2003

(65) Prior Publication Data

US 2004/0212958 A1 Oct. 28, 2004

(51) Int. Cl.
*G06F 1/16* (2006.01)
*G06F 1/20* (2006.01)

(52) U.S. Cl. .................. 361/686; 361/687; 165/104.44; 312/205

(58) Field of Classification Search ......... 361/683–697, 361/600, 678, 679, 610; 165/80.2, 80.3, 80.4, 165/104.43, 104.44; 312/205, 223.1, 223.2
See application file for complete search history.

(56) References Cited

U.S. PATENT DOCUMENTS

| | | | |
|---|---|---|---|
| 5,061,001 A | 10/1991 | Madden et al. | 296/26 |
| 5,242,056 A | 9/1993 | Zia et al. | 206/576 |
| 5,248,180 A | 9/1993 | Hussaini | 296/171 |
| 5,393,241 A | 2/1995 | Honda et al. | 439/248 |
| 5,504,648 A | 4/1996 | Honda et al. | 361/686 |
| 5,552,960 A * | 9/1996 | Nelson et al. | 361/687 |
| 5,732,140 A | 3/1998 | Thayer | 381/24 |
| 5,738,537 A | 4/1998 | Setoguchi et al. | 439/159 |
| 5,762,250 A | 6/1998 | Carlton et al. | 224/579 |
| 5,898,568 A * | 4/1999 | Cheng | 361/695 |
| 5,910,642 A | 6/1999 | Daoud | 174/57 |
| 5,913,926 A | 6/1999 | Anderson et al. | 714/6 |
| 5,995,025 A | 11/1999 | Sternglass et al. | 341/22 |
| 6,034,871 A * | 3/2000 | Cheng | 361/695 |
| 6,116,447 A | 9/2000 | Daoud | 220/4.03 |
| 6,181,554 B1 * | 1/2001 | Cipolla et al. | 361/687 |
| 6,266,241 B1 * | 7/2001 | Van Brocklin et al. | 361/687 |
| 6,353,535 B1 * | 3/2002 | Yoshida | 361/686 |
| 6,359,218 B1 | 3/2002 | Koch et al. | 174/50 |
| 6,402,031 B1 | 6/2002 | Hall | 235/400 |
| 6,421,235 B1 | 7/2002 | Ditzik | 361/683 |
| 6,457,277 B1 | 10/2002 | Meyers | 52/36.1 |
| 6,459,573 B1 * | 10/2002 | DiStefano et al. | 361/687 |
| 6,496,369 B1 * | 12/2002 | Nakamura | 361/697 |
| 6,515,856 B1 * | 2/2003 | Hidesawa | 361/687 |
| 6,599,090 B1 * | 7/2003 | Ozaki et al. | 361/687 |

* cited by examiner

*Primary Examiner*—Lisa-Lea Edmonds
(74) *Attorney, Agent, or Firm*—Duke W. Yee; Marilyn Smith Dawkins; Wayne P. Bailey

(57) ABSTRACT

A portable device having improved configurability and adaptability. The portable device has a case or chassis that can be placed in either an open or closed position, to thereby allow for insertion and removal of other devices within the portable device. When increased functionality is required or desired, the device's case is expanded by placing it in an open position, to allow additional devices to be operated in conjunction with the portable device. These devices can provide various types of electronic or computer operations, such as electronic adapters or media drives, as well as mechanical operations such as air movement with one or more additional fans or other types of heat sink. When decreased functionality is required or desired, such as to reduce the overall size and weight of the portable device, the device's case is contracted by placing it in a closed position. This allows on-demand expansion and contraction capability for the portable device. The expandable case provides dual functionality by also providing improved cooling for the portable device when in an open position.

13 Claims, 6 Drawing Sheets

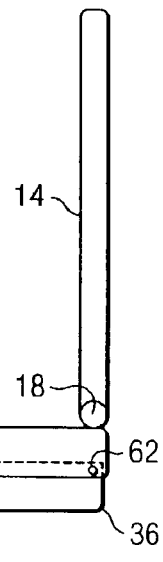
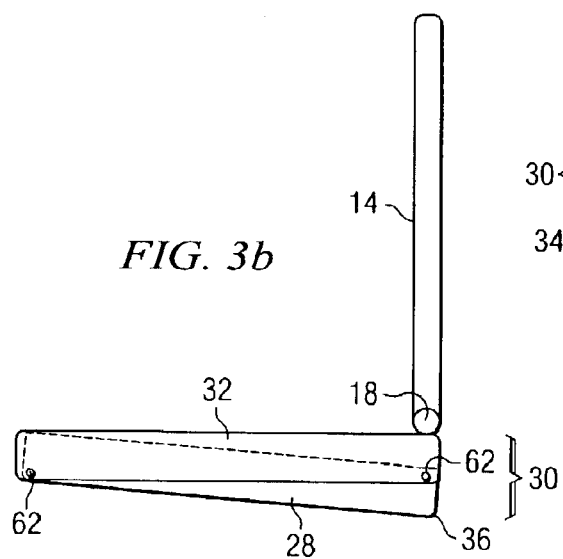
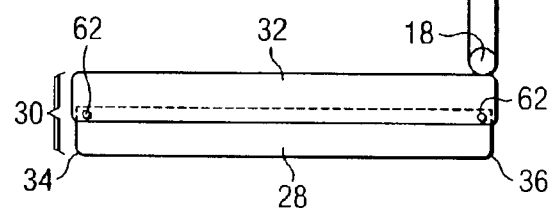
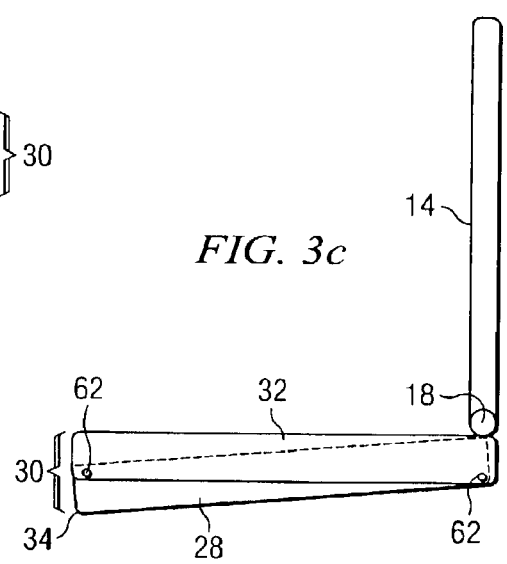
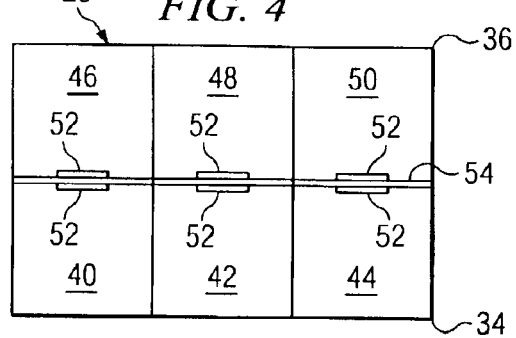

PORTABLE ELECTRONIC DEVICE WITH ADAPTIVE SIZING

BACKGROUND OF THE INVENTION

1. Technical Field

The present invention relates to electronic and data processing devices and systems, and more particularly relates to portable electronic and data processing devices and systems with built-in expansion and retraction capability.

2. Description of Related Art

Technological advances in the computer and communication industry have resulted in improved integration capabilities. For example, integrated circuit densities are increasing which allow more functionality to be packaged into integrated circuit (IC) devices. This allows computers and other types of electronic devices to be built with fewer discreet components than previously required. Fewer components means that the resulting product can be packaged in a smaller package. Laptop computers weighing 5 pounds and less have computing capability similar to that of mainframe computers that existed twenty years ago. Personal digital assistants and cell phones, both of which have built in computational capability, can easily fit in a shirt pocket using today's technology.

This increase in electronic packaging density is not without problems, however. Heat dissipation is rapidly becoming a critical limiting factor in system design, potentially limiting the ability to achieve full size reduction due to physical mass requirements for dissipation of heat generated by the electronic device.

In addition, some devices cannot take full advantage of electronic packaging shrinkage due to the human factor effect, where a device must maintain a certain physical size to allow ease of human interaction. Cell phones with keyboards are an example where a device cannot be shrunk to its absolute smallest physical size, but rather must maintain a certain physical mass to allow a user to conveniently input keystrokes on the keyboard. While certain of these devices, such as personal digital assistants, have attempted to overcome this hurdle by eliminating the keyboard, they have introduced their own problems by requiring a user to learn a new input language that allows interaction via a touch sensitive display screen.

Another concern with shrinkage of physical packaging is the loss of system configuration capability. For example, many types of personal computers are built with a tower type of chassis. The tower chassis has many different physical compartments, allowing for a single style of tower to support many different types of computer configurations. Drive bays can be populated with a mixture of hard disk drives, floppy disk drives, compact disk drives, DVD drives, etc., allowing for a computer system to be customizable for a particular application. Numerous card slots on a motherboard contained with the tower chassis are user accessible, allowing a user to further configure/customize their system to include different types of adapter cards such as display adapters, SCSI adapters, USB adapters, network adapters, modems, etc. Some of the flexibility provided by these tower chassis is lost when a user instead uses a portable electronic device such as a laptop computer. Laptops (and portable electronic devices in general) have limited upgrade capabilities. For example, a laptop may allow an installed floppy disk drive to be removed and replaced with a CD drive. PCMCIA cards also allow for limited add-on capability, such as by connecting an external hard disk drive to the laptop using a USB adapter that is PCMCIA compatible. However, the number of available PCMCIA slots is typically limited to one or two in current laptop computers. Docking stations have been introduced to partially mitigate this loss of upgradeability and functionality, where a laptop is docked into the docking station when a user is in their office or home. This docking station may provide functionality that is available to the user, but only while their laptop is actually docked in the station. Other types of portable electronic devices, such as digital cameras, cell phones, etc. generally only have a memory expansion slot. Thus, as devices get smaller and smaller, their adaptability and configurability is similarly reduced. The present invention is directed to solving these problems.

SUMMARY OF THE INVENTION

The present invention is directed to a portable device that has improved configurability and adaptability. The portable device has a case or chassis that can be placed in either an open or closed position, to thereby allow for insertion and removal of other devices within the portable device. When increased functionality is required or desired, the device's case is expanded by placing it in an open position, to allow additional devices to be operated in conjunction with the portable device. These devices can provide various types of electronic or computer operations, such ma electronic adapters or media drives, as well as mechanical operations such as air movement with one or more additional fans or other types of heat sink. When decreased functionality is required or desired, such as to reduce the overall size and weight of the portable device, the device's case is contracted by placing it in a closed position. This allows on-demand expansion and contraction capability for the portable device. The expandable case provides dual functionality by also providing improved cooling for the portable device when in an open position.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

BRIEF DESCRIPTION OF THE DRAWINGS

FIGS. 3a-3c show side views of the portable electronic device with collapsible/expandable chassis in a fully expanded, rear expanded and front expanded position, respectively.

FIG. 4 shows a top view of the lower expandable collapsible portion, and further shows a plurality of device bays contained therein.

DETAILED DESCRIPTION OF THE PREFERRED EMBODIMENT

Figure 1:
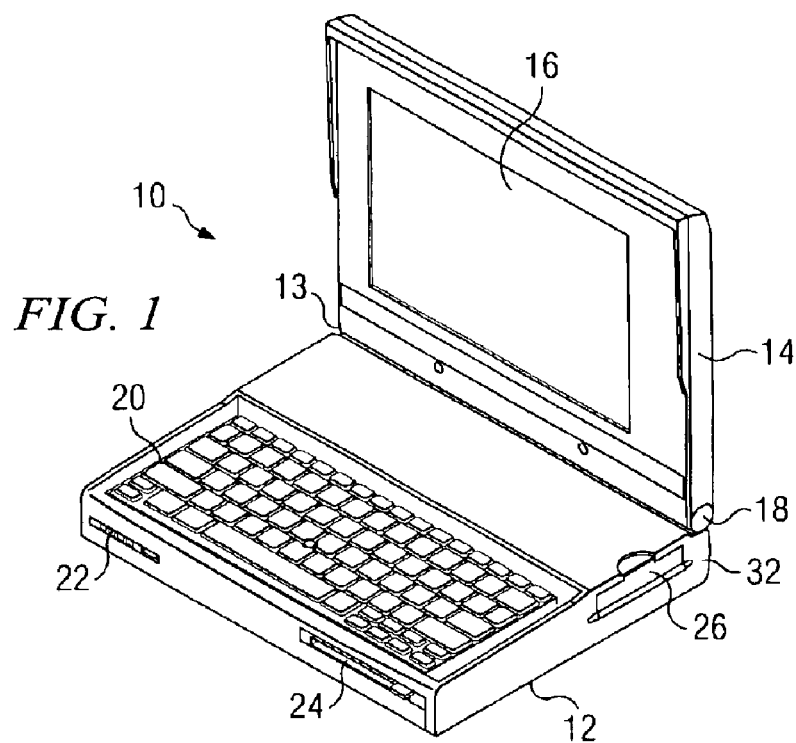
FIG. 1 shows a typical portable electronic device.

Referring now to FIG. 1, there is shown one type of portable device to which the present invention pertains. However, it should be noted that the present invention is applicable to many different types of portable electronic devices, such as cellular phones, personal digital assistants (PDAs), global positioning satellite (GPS) devices, digital cameras, wristwatch computers, etc., and combinations of one or more of the above packaged together with one another. Continuing with FIG. 1, there is shown in the preferred embodiment a laptop computer 10, having a case or chassis 12, and an upper cover 14 pivotally attached to the chassis 12 along hinge 18. The upper cover 14 contains a display 16, such as a liquid crystal diode (LCD) display. Computer 10 may optionally contain a keyboard 20, although not required, as user input operations to computer 10 could also be made through a touch sensitive LCD display 16 using either a finger or stylus, for example.

Case 12 typically contains additional electronic components that make up the computer, such as a main electronic board (not shown, since it's inside the case), sometimes called a motherboard, and various peripheral devices such as a floppy disk drive 22, compact disc (CD) drive 24, one or more battery packs (not shown), and other types of I/O adapter cards such as PCMCIA form factor cards that are pluggable into computer 10 at 26 to provide further I/O functionality such as a universal serial bus (USB) interface, wireless or wired network attachment, and the like. Due to the ever increasing types of new I/O devices that are being introduced into the marketplace at an ever increasing rate, it is easy for computer 10 to have all available expansion and I/O ports filled with adapters and other types of devices, such that it is not possible to add a new device without removal of an existing adapter/device.

Figure 2:
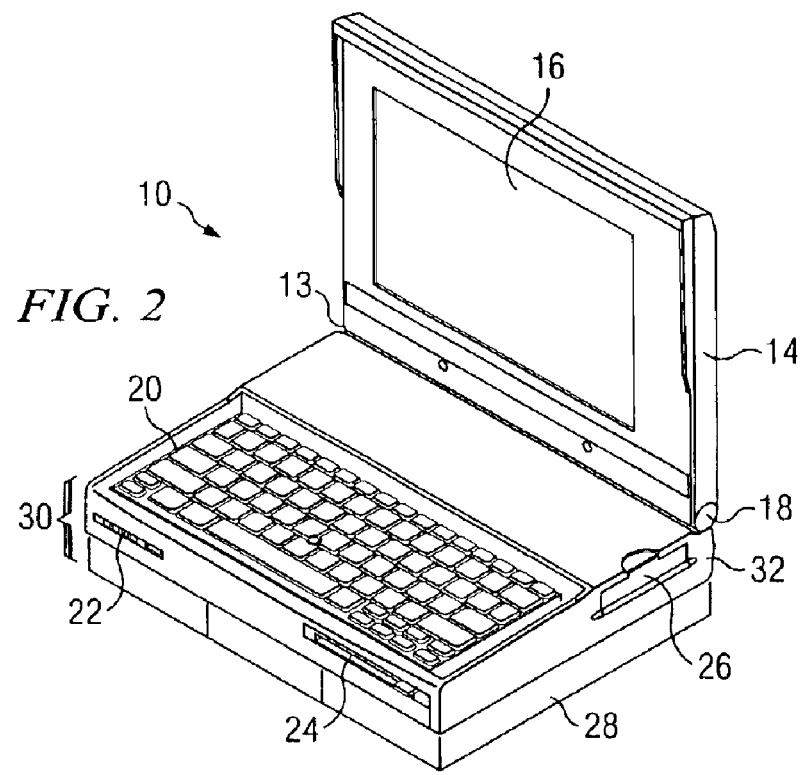
FIG. 2 shows a portable electronic device having a collapsible/expandable chassis in an expanded position.

Referring now to FIG. 2, there is shown a portable device 10 having an expandable case or chassis 30, which comprises a fixed portion 32 and a collapsible/expandable portion 28. The features and functionality provided by portion 28 are many and varied. When in an expanded mode of operation, portion 28 provides additional chassis space that may be used to support additional media drives, memory such as DRAM or flash memory, I/O adapters, or other types of devices such as battery packs or cooling fans. Alternatively, portion 28 could be placed in a collapsible mode, where a user wants to decrease the size and weight of the portable device in certain situations such as when traveling. In this case, the additional devices in portion 28 are removed, and portion 28 is collapsed to be inside fixed portion 32, as will be further described below.

Additionally, the expanded mode of operation can be used to improve passive cooling of computer 10, whereby collapsible/expandable portion 28 is locked in an expanded position, but instead of adding additional devices into the additional chassis space, the space is left vacant to create a greater amount of air surface for electronic components within the computer.

Referring now to FIGS. 3a–3c, various configurations of collapsible/expandable portion 28 are shown. Each view shows a case or chassis 30 comprising an upper portion 32 and lower portion 28 having a front side 34 and a back side 36, and an upper cover 14 pivotally attached by hinge 18. In FIG. 3a, lower collapsible/expandable portion 28 is shown to be fully extended, where both the front side 34 and back side 36 are extended downward from upper portion 32 and locked into place with guide pins 62. In FIG. 3b, collapsible/expandable portion 28 is shown to be partially extended, where back portion 36 is extended downward from fixed portion 32, but the front portion is not extended downward. Front portion pivots about pin 62 to allow the back portion to extend downward. In FIG. 3c, collapsible/expandable portion 28 is shown to be partially extended, where front portion 34 is extended downward from fixed portion 32, but the rear portion is not extended downward. Rear portion pivots about pin 62 to allow the front portion to extend downward.

This type of collapsible/expandable operation is particularly useful when lower portion 28 is internally divided into a series of device bays running along both the front and back. In the position shown in FIG. 3a, all internal bays in both the front and the back of portion 28 would be user accessible. In the position shown in FIG. 3b, the internal bays in the back of portion 28 would be user accessible, and likewise, when in the position shown in FIG. 3c, the internal bays in the front of portion 28 would be user accessible.

One exemplary layout for such internal bays is shown in FIG. 4, which is a top view of the lower collapsible/expandable portion 28. It is shown in the preferred embodiment as having three internal bays 40, 42, 44 located along the front side 34 of lower portion 28, and three internal bays 46, 48, 50 located along the back side 36 of lower portion 28. These bays are used to hold the additional devices to be added to computer 10 when in a partial or full extended mode of operation. The bays preferably contain at least one connector 52 for electrical connection of devices to computer 10. A circuit board with printed traces or a wiring harness is contained within raceway 54 to route signals and power to/from the individual connectors 52 and other components contained within computer 10. While six (6) bays are shown in the preferred embodiment, the present invention is meant to cover differing bay configurations, such as a single row accessible from the front, and single row accessible from the rear, one or more rows accessible from the side, and any number of device bays that be physically accommodated in portion 28.

Figure 5A:
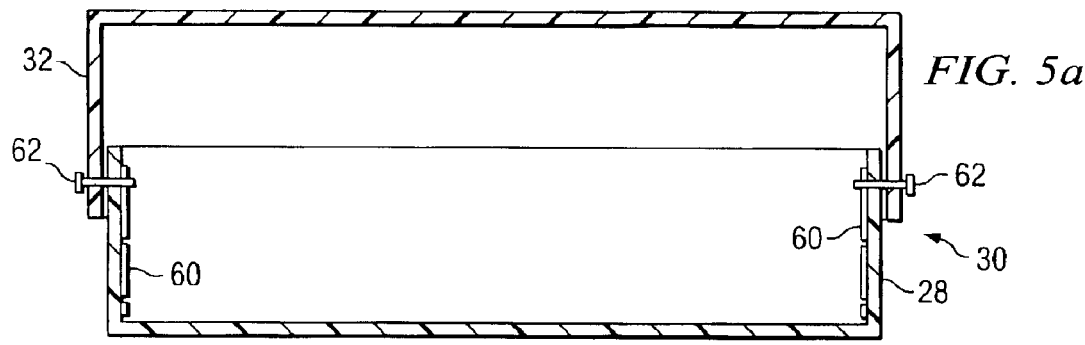
FIGS. 5a-5b show front views of the collapsible/expandable chassis, in a fully expanded and fully collapsed position, respectively.
Figure 6A:
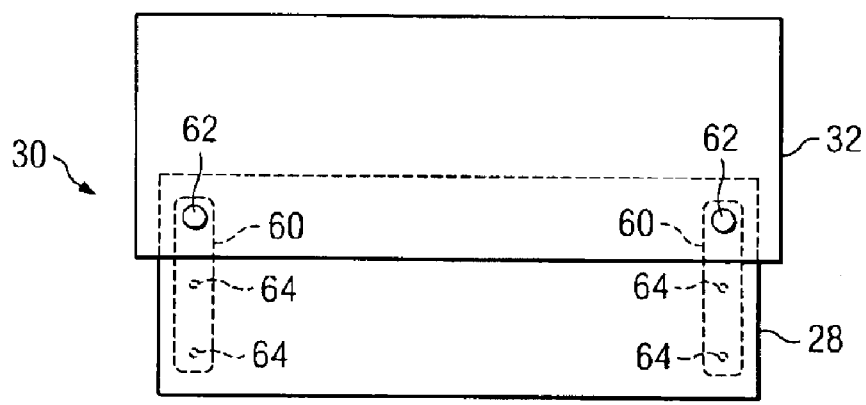
FIGS. 6a-6c show side views of the collapsible/expandable chassis in a fully expanded, rear expanded and front expanded position, respectively.

Collapsible/expandable portion 28 is mechanically configured to an open or closed position using any one of numerous types of mechanical means, such as along a substantially linear cam track/path with detent guide pins. Referring now to FIG. 5a, a front internal view of expandable chassis 30 is shown in a fully open position. Affixed near the front of both the left and right sides of lower portion 28 is a cam track/path 60 such as an elongated piece of stainless steel (as shown in FIG. 6), and having various detent holes 64 for positive engagement with the detent pin 62 when in a closed/locked position. A detent pin 62 extends through both of the front left and front right sides of upper portion 32 and lower portion 28, as shown in FIG. 6a, to positively engage with each of the front cam track/paths 60. These cam tracks and detent pins are used to expand and collapse the front portion of expandable chassis 30. An identical set of cam tracks/paths and detent pins are provided at the rear of the collapsible/expandable portion 28 and fixed portion 32, respectively, to expand and collapse the rear portion of expandable chassis 30.

Figure 5B:
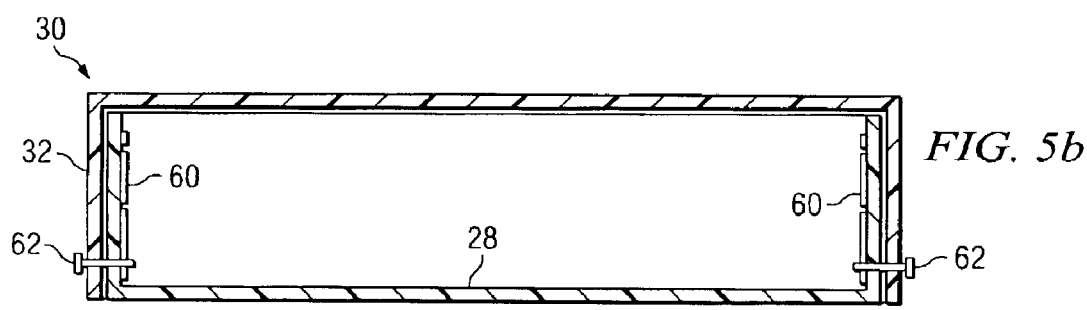

FIG. 5b shows chassis 30 in a retracted position, where expandable/retractable portion 28 is held within fixed portion 32 by the detent pins 62 and cam track/path surface 60, with the detent pins positively engaged with the lower portion of cam track 60.

FIG. 6a is an exploded side view similar to FIG. 3a, but showing detent pins 62 and cam track 60 in more detail, including holes 64 in the cam track that allow for pin 62 insertion to lock the lower section 28 in a particular position such as expanded or collapsed. Similarly, FIG. 6b shows the latching used to accomplish the rear-only access as shown in FIG. 3b, and FIG. 6c shows the latching used to accomplish the front-only access as shown in FIG. 3c.

Figure 6B:
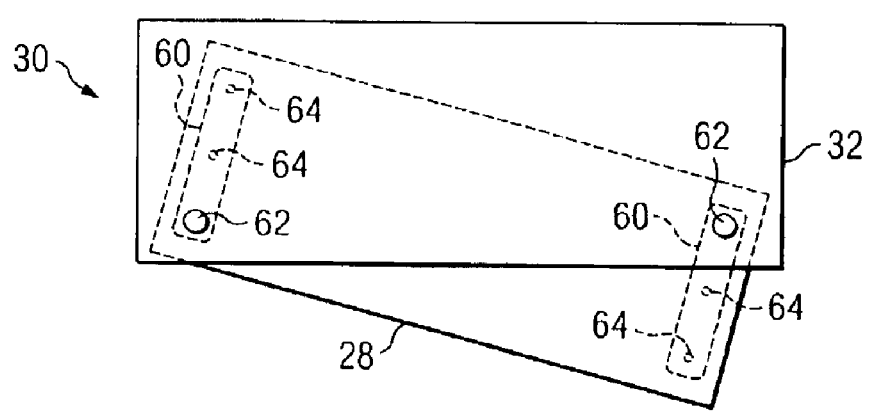
Figure 6C:
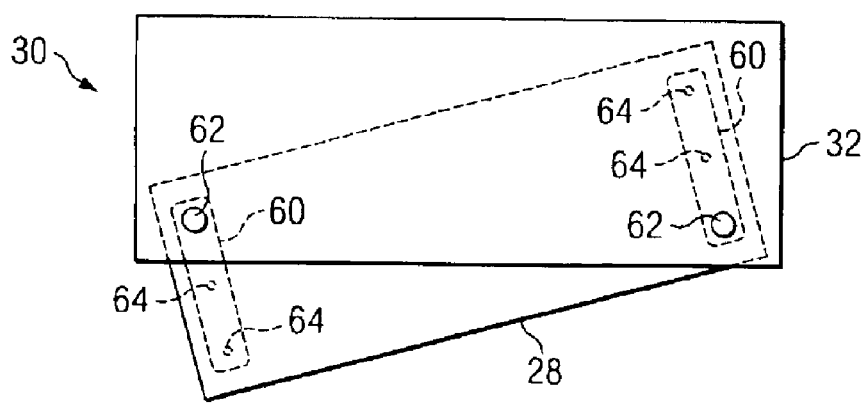

As can be seen in FIGS. 6a–6c, when the lower section 28 is partially or fully expanded, user access is provided that allows a user to insert or remove one or more devices from the lower section 28. The devices are preferably snapped into place the same way as adapters and devices are plugged into fixed portion 12 and 32 of FIGS. 1 and 2, respectively. For example, removable CD drives are plugged into a connector in the bay. PCMCIA form-factored devices are plugged into a PCMCIA-compatible slot.

The use of detent guide pins with the linear cam mechanism advantageously allows for both a linear extension/retraction of the lower case, as well as a pivotal hinge when only the front or rear portion is extended or retracted. However, other mechanical mechanisms can be used instead of a cam and pin for expanding and collapsing the case. For example, and without limitation: a ratchet and wheel; a ratch and pawl; an adjustable hinge; a threaded shaft and thumbwheel; or a spring could also be utilized for this purpose.

Figure 7A:
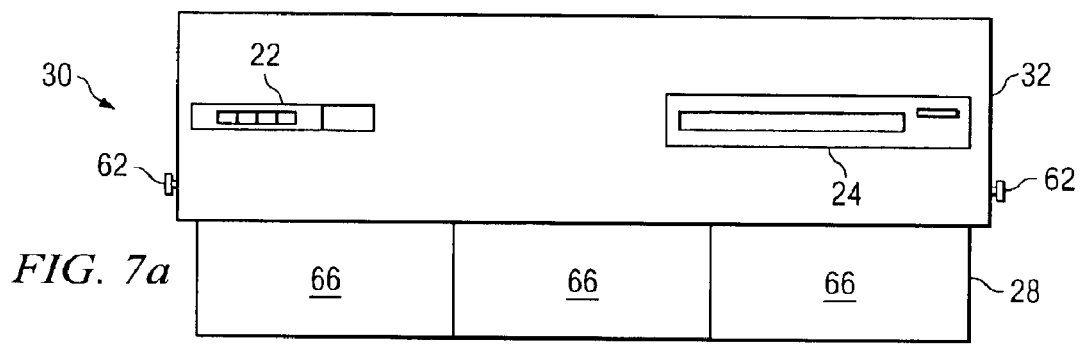
FIGS. 7a-7b show front and back views, respectively, of the expandable chassis with its associated installed devices.

FIG. 7a shows a front external view of expandable chassis 30 in a fully expanded position. Upper portion 32 is shown having a floppy disk drive 22 and CD drive 24 contained therein. Lower collapsible/expandable portion 28 is shown with three front bays (as previously described with respect to FIG. 4), each being covered with an optional removable cover 66 to mitigate dirt and dust when no devices are installed in a particular bay. Detent pins 62 for locking lower portion 28 in a particular position are also shown.

Figure 7B:
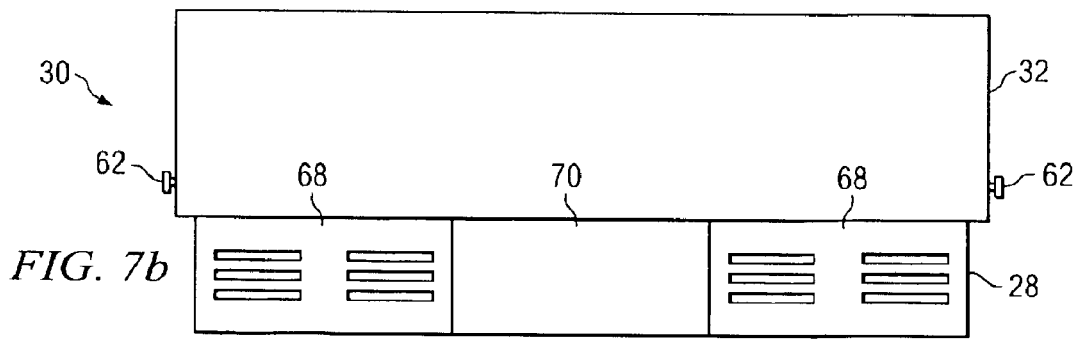

FIG. 7b shows a rear view of chassis 30 in a fully expanded position. Lower collapsible/expandable portion 28 is shown with three rear bays (as previously described with respect to FIG. 4). The two outer bays 68 are shown each having a cooling fan (with slotted cooling vents) contained therein. The inner bay 70 could be left empty or contain its own device such as a media drive, battery pack, or yet another cooling fan. Because the bays are standardized in the preferred embodiment, it is easy to mix and match from a plurality of devices that conform to the mechanical size and shape of these bays.

Improved cooling characteristics are also provided by the expandable chassis 30. For example, opening lower section 28 into its expanded position increases natural convection air-flow into and out of computer 10, allowing heat to escape from the computer. In this instance, one or more of the optional removable covers 66 are not attached to chassis 30, in order to increase air flow inside chassis 30. In an alternate embodiment, one or more fans are installed in lower section 28 to further increase air flow, as previously described.

Figure 8A:
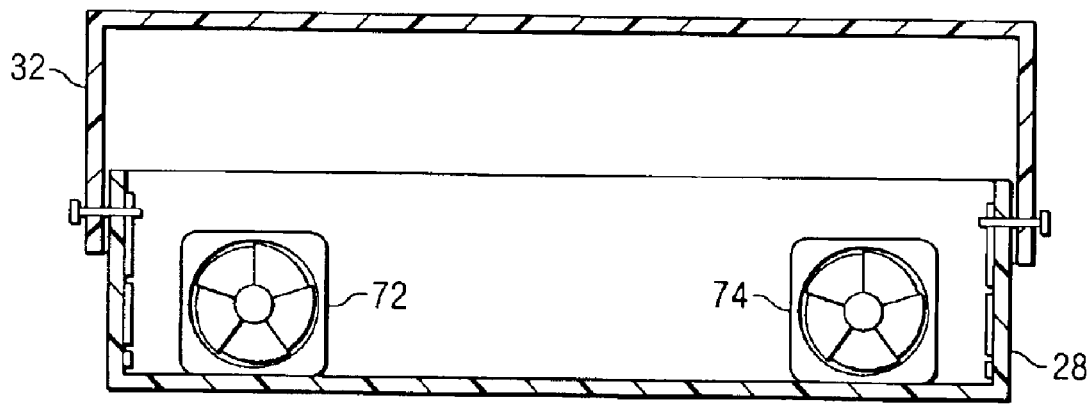
FIGS. 8a-8b show a front view of the collapsible/expandable chassis, in a fully expanded and fully collapsed position, respectively, and having hinged fans attached to the bottom of the chassis.
Figure 8B:
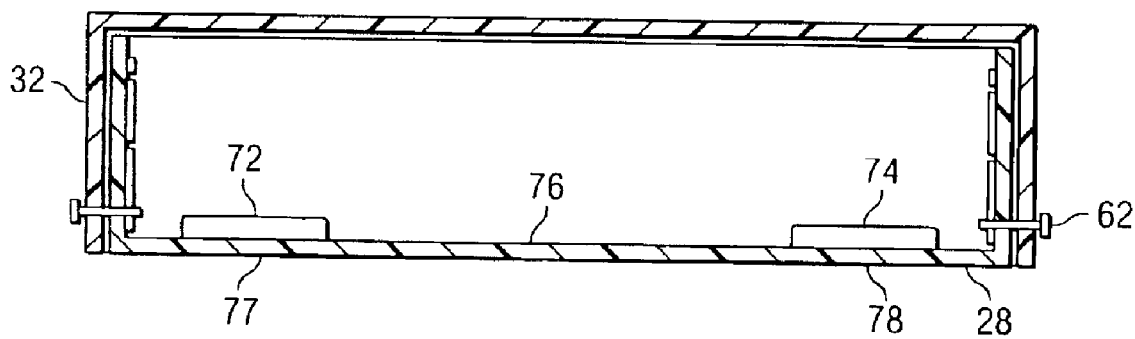

In yet a further refinement of the above described collapsible/expandable case 30, it is possible to store one or more fans in the case, either in the upper portion 32 or lower portion 28. When the lower portion is in its retractable position, the fan(s) similarly retract, and when the lower portion is in its expandable position, the fan(s) extend to be in an operating position. Referring now to FIG. 8a, there is shown a rear internal view of case 30 in an expanded position, and having two fans 72 and 74 extended in an upright position in, for example, bays 46 and 50 shown in FIG. 4. FIG. 8b shows a rear internal view of case 30 in a collapsed position, with the two fans 72 and 74 retracted or laying down in lower portion 28, so as not to interfere with electronics or other physical structures (not shown) that reside in upper portion 32. The fans 72 and 74 in this embodiment are preferably attached to the bottom 76 of lower portion 28 by a lockable hinge that allows the fans to be raised or lowered and locked into position. The fans are attached to connector 52 by a cable to allow the fan to pivot and yet maintain a connection to power that is provided at connector 52. While it is preferable to operate the fans when in the upright position shown in FIG. 8a, it is also possible to operate the fans when in their lowered position as shown in FIG. 8b, by providing air vents in the bottom 76 of lower portion 28, immediately under the fan(s) footprint at 77 and 78.

Figure 9:
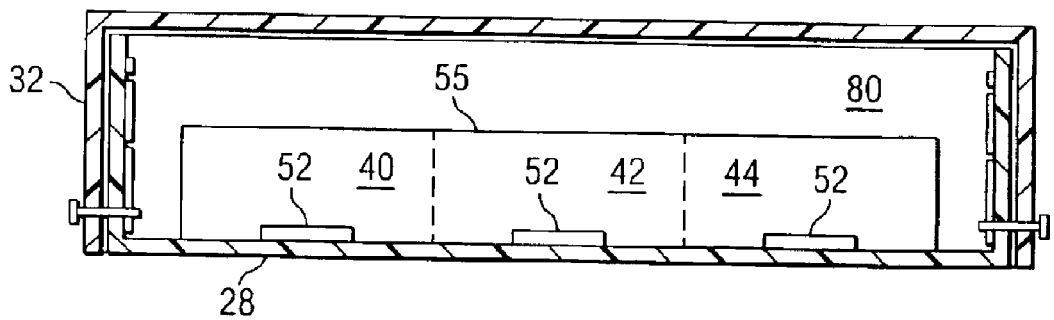
FIG. 9 shows a front view of the collapsible/expandable chassis, in a fully collapsed position, with device bays.

Depending upon the physical location of electronics such as main planar board in the upper section 32 of case 30, it may be desirable to have the bays 40–50 of FIG. 4 be collapsible in a similar fashion to that just described regarding the fans. This would mitigate clearance issues that may otherwise exist for physical structures in the lower portion 28 when in a collapsed position and abutting physical structures in upper section 32. For example, as shown in FIG. 9, a front internal view of bays 40–44 is shown when case 30 is in a collapsed position. Connectors 52 are shown attached to printed circuit board or backplane 55, such that when a device is plugged into one of the bays, electrical connection is made between the attached device and portable device 10. It can be seen that the bays 40–44 consume approximately 50 percent of the internal space 80 within upper section 80 in this particular embodiment. This limits the amount of physical space that is useable in upper section 32 when case 30 is in a collapsed position, since the physical structures in lower portion 28 cannot physically interfere with physical structures in upper portion 32 when in the collapsed position.

Figure 10A:
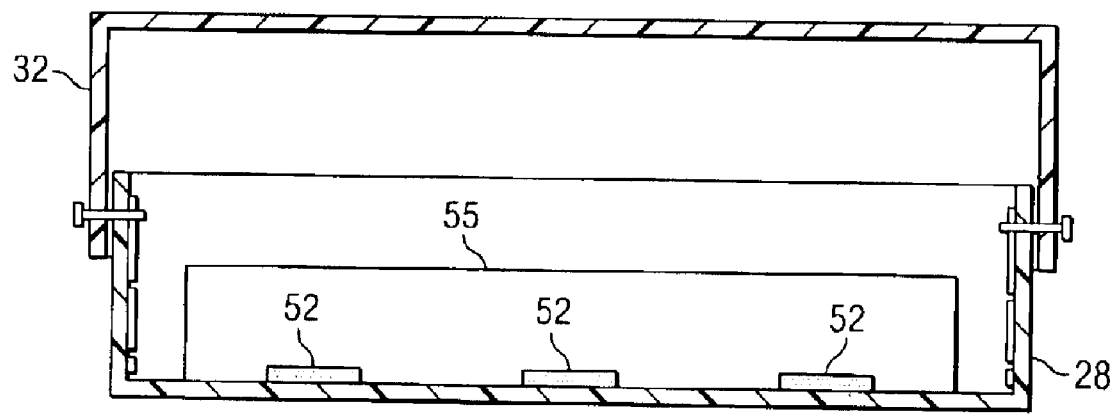
FIGS. 10a–10b show a front view of the collapsible/expandable chassis, in a fully expanded and fully collapsed position, respectively, and having a hinged board/backplane attached to the bottom of the chassis.
Figure 10B:
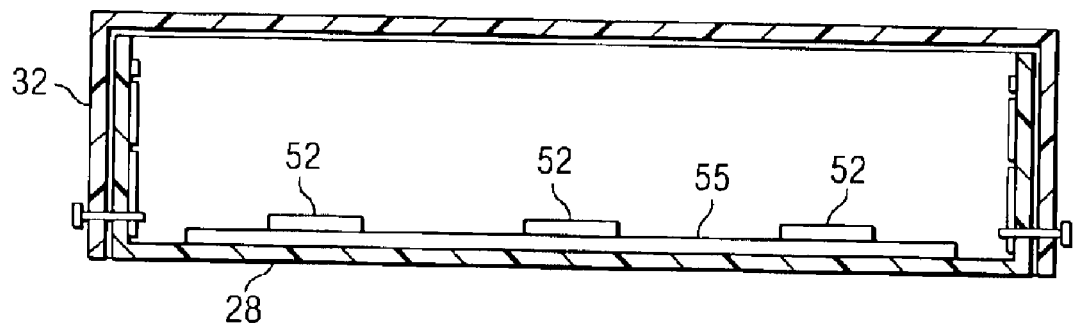

To help mitigate these physical constraints, such as when the upper section 32 needs to contain large numbers or sizes of physical objects, bays 40–44 can optionally be collapsible, similar to the fans 72 and 74 of FIGS. 8a–8b. In this bay-collapsible embodiment, board or backplane 54 is pivotally attached to lower surface 76 of lower portion 28, allowing the board/backplane to be folded down into an unusable position when all bays are empty and lower section 28 is collapsed into upper section 32. This is shown in FIG. 10a-b, with FIG. 10a showing case 30 expanded and backplane 55 in an upright position to allow for insertion of devices, and FIG. 10b showing case 30 collapsed and backplane 55 in a downward position to reduce the vertical interference with other devices that exist in upper section 32. In this particular embodiment, a wiring harness (not shown) is used to electrically connect backplane 55 to other electronics within computer 10.

Another feature and advantage of the present invention pertains to usability and human factors of the portable electronic device. As can be seen with reference to FIG. 3b, collapsible/expandable portion 28 is shown to be partially extended, where back portion 36 is extended downward from fixed portion 32, but the front portion is not extended downward. If this device contained a keyboard (as shown in FIG. 2), and were to be set on a flat surface, it would cause the back of the device, including the keyboard, to raise upward toward the user, providing an inclined typing surface that is preferred by some keyboard users. Likewise, as can be seen with reference to FIG. 3c, where front portion 34 is extended downward from fixed portion 32, but the rear portion is not extended downward, the keyboard would decline away from the user when on a flat surface. While this is generally not a desired keyboard orientation for typing when the device is on a flat surface, it may in fact be useful if the electronic device is resting on a user's legs or lap. If the user has long legs, the user may want a declining keyboard orientation to offset the otherwise inclining orientation that is caused by placing the device on the leg's or lap of a person with long legs—and hence make the keyboard more level. If the user has short legs, they may want an inclining keyboard orientation to offset the otherwise declining orientation that is caused by placing the device on the leg's or lap of a person with short legs—and hence make the keyboard more level. In general, the feature and advantage of the partially collapsible/expandable portion is to allow a user to customize the electronic devices orientation with respect to the user to allow the user to adjust the device to his or her desired orientation for operation and use of the electronic device.

It should be appreciated that the above embodiments of the present invention are only exemplary and are not intended to describe or imply any structural or functional limitations of the present invention. Modifications to the particular mechanism for providing the hinged lower surface will be apparent to those of ordinary skill in the art in view of the present disclosure and may be used without departing from the spirit and scope of the present invention. For example, in an alternative embodiment of the present invention, a spring and teeth based mechanism may be used for dropping the lower surface of the housing of the present invention. In such an embodiment, a spring-loaded peg or other type of mechanism having teeth formed in a surface thereon, may be used to engage teeth formed on a vertical support member. By pressing on the peg, the engagement of the teeth formed on the peg and the teeth formed on the vertical support member is released so that the bottom surface may be moved. When the peg is released, the teeth formed in the peg again engage the teeth in the vertical support member and are thereby locked in place. Such a spring-piston based mechanism may be provided at a plurality of locations on the bottom surface of the housing and corresponding locations on the side surfaces of the housing.

In yet another embodiment of the present invention a support beam may be provided along the center of the bottom of the housing. The support beam may be attached to the housing at the sides surfaces of the housing. The bottom surface of the housing may be provided in two parts both parts hinged at the support beam such that the first part may be dropped to provide an opening toward the front of the housing and the second part may be dropped to provide an opening towards the back of the housing. Both the first and second parts may be dropped at the same time providing openings in both the front and back of the housing. Support members may be provided at front, back and side positions of the two parts so as to provide extra load bearing members.

In addition, these alternative embodiments may be used in conjunction with the embodiments previously discussed. Of course other embodiments may be used in place of or in combination with the above described embodiments without departing from the spirit and scope of the present invention.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A portable electronic device, comprising:
    a hinged cover that is operable to open and close, wherein when open, an expansion bay is accessible by a user to add at last one fan to the portable electronic device, wherein the fan is moveable to a retracted position when the cover is closed, and moveable to an extended position when the cover is open.

2. The portable electronic device of claim 1, wherein the fan is coupled to the cover by a lockable hinge to allow the fan to be raised, lowered and locked into position.

3. A portable electronic device, comprising:
    a hinged cover that is operable to open and close, wherein when open, an expansion bay is accessible by a user to add at least one fan to the portable electronic device, wherein the hinged cover is a bottom cover of the electronic device.

4. A portable electronic device, comprising:
    a chassis; and
    a cover that is fixedly attached to the chassis, and is operable to lock in an open position and lock in a closed position, wherein when locked in the open position at least one expansion bay is user accessible to add at least one fan to the portable electronic device, wherein the fan is moveable to a retracted position when the cover is in the closed position, and moveable to an extended position when the cover is in the open position.

5. The portable electronic device of claim 4, the fan is coupled to the cover by a lockable hinge to allow the fan to be raised, lowered and locked into position.

6. A portable electronic device, comprising:
    a chassis; and
    a cover that is fixedly attached to the chassis, and is operable to lock in an open position and lock in a closed position, wherein when locked in the open position at least one expansion bay is user accessible to add at least one fan to the portable electronic device, wherein the cover is a bottom cover of the electronic device.

7. A portable electronic device, comprising:
    a chassis; and
    a cover that is fixedly attached to the chassis, and is operable to lock in an open position and lock in a closed position, wherein when locked in the open position at least one expansion bay is user accessible to add at least one fan to the portable electronic device, wherein the expansion bay collapses from an extended position when the cover is positioned to the closed position.

8. A portable electronic device, comprising:
    a chassis; and
    a cover that is fixedly attached to the chassis, and is operable to lock in an open position and lock in a closed position, wherein when locked in the open position at least one expansion bay is user accessible to add at least one fan to the portable electronic device, wherein the expansion bay extends from a collapsed position when the cover is positioned to the open position.

9. A method of operating a portable electronic device, comprising the steps of:
    unlatching a bottom cover of the portable electronic device;

opening the unlatched bottom cover;

latching the unlatched bottom cover in an open position, wherein the bottom cover has a plurality of sides, and at least two of the plurality of sides is hingedly attached to the portable electronic device, and the step of opening the unlatched bottom cover comprises a step of rotating the bottom cover about one of the at least two hingedly attached sides; and adding an additional device to the portable electronic device through the open position.

10. A housing for a portable electronic devices, comprising:

a top surface;

a perpendicular side around the perimeter of the top surface, wherein the perpendicular side has a height to physically accommodate internal components;

an expandable bottom surface at least partially within the height of the perpendicular side when in a collapsed position, and at least partially outside the height of the perpendicular side when in an expanded position to enable addition of at least one heat dissipating device by a user; and at least one additional internal component coupled to the expandable bottom surface.

11. The housing of claim 10, further comprising a latching mechanism to latch the expandable bottom surface when in the collapsed position.

12. The housing of claim 10, further comprising a latching mechanism to latch the expandable bottom surface when in the expanded position.

13. A housing for a portable electronic device, comprising:

a top surface;

a perpendicular side around the perimeter of the top surface, wherein the perpendicular side has a height to physically accommodate internal components;

an expandable bottom surface at least partially within the height of the perpendicular side when in a collapsed position, and at least partially outside the height of the perpendicular side when in an expanded position; and a latching mechanism that provides both (i) rotational movement of the expandable bottom surface to provide partial expansion of the portable electronic device and (ii) linear movement of the expandable bottom surface to provide full expansion of the portable electronic device.

* * * * *